United States Patent [19]

Franklin

[11] Patent Number: 4,752,520
[45] Date of Patent: Jun. 21, 1988

[54] REINFORCED CONCRETE TILE AND ITS METHOD OF MANUFACTURE

[75] Inventor: Robert B. Franklin, Phoenix, Ariz.

[73] Assignee: Builder's Research and Development Corporation, Phoenix, Ariz.

[21] Appl. No.: 941,608

[22] Filed: Dec. 15, 1986

[51] Int. Cl.⁴ ............................................. B32B 3/00
[52] U.S. Cl. .................................. 428/161; 264/46.4; 264/212; 264/214; 264/228; 264/DIG. 43; 428/163; 428/172; 428/251; 428/285
[58] Field of Search ............... 428/161, 163, 172, 251, 428/285; 264/46.4, 212, 214, 228, DIG. 43

[56] References Cited

U.S. PATENT DOCUMENTS

| | | | |
|---|---|---|---|
| 1,806,060 | 5/1932 | Stryker, Jr. | 264/231 |
| 2,292,444 | 8/1942 | Haydon et al. | 72/18 |
| 2,560,781 | 7/1951 | Schaaf | 25/154 |
| 2,740,162 | 4/1956 | Knight | 18/60 |
| 2,805,448 | 9/1957 | Rubenstein | 18/60 |
| 3,479,704 | 11/1969 | Reed | 25/41 |
| 3,870,546 | 3/1975 | Gelsomino | 117/72 |
| 4,065,924 | 1/1978 | Young | 61/7 |
| 4,088,808 | 5/1978 | Cornwell | 428/409 |
| 4,132,043 | 1/1979 | Juba | 52/309 |
| 4,476,657 | 10/1984 | Juba et al. | 52/139 |

Primary Examiner—Marion C. McCamish
Attorney, Agent, or Firm—Luedeka, Hodges & Neely

[57] ABSTRACT

A concrete tile is disclosed having a preformed substrate member backing comprising a substantially rigid, polymeric material. The lower surface of the substrate member defines the shape of the lower surface of the tile. A concrete layer is disposed on and secured to the upper surface of the substrate member and defines the shape of the upper surface of the tile. In manufacturing the tile, a plurality of through openings in the substrate member are filled with the concrete when the concrete is applied to the substrate member. The concrete is cured on the substrate member and the hardened concrete in the openings of the substrate member forms studs securing the substrate member and concrete layer together. The use of a polymeric substrate member backing provides a tile which uses less concrete and is therefore substantially lighter in weight than other tiles of corresponding strength. The method of manufacturing the tiles utilizes the substrate member as a support for the concrete applied to its upper surface. This eliminates the previous practice of removing supporting pallets from the production line which greatly reduces the number of pallets that need to be purchased and handled.

10 Claims, 3 Drawing Sheets

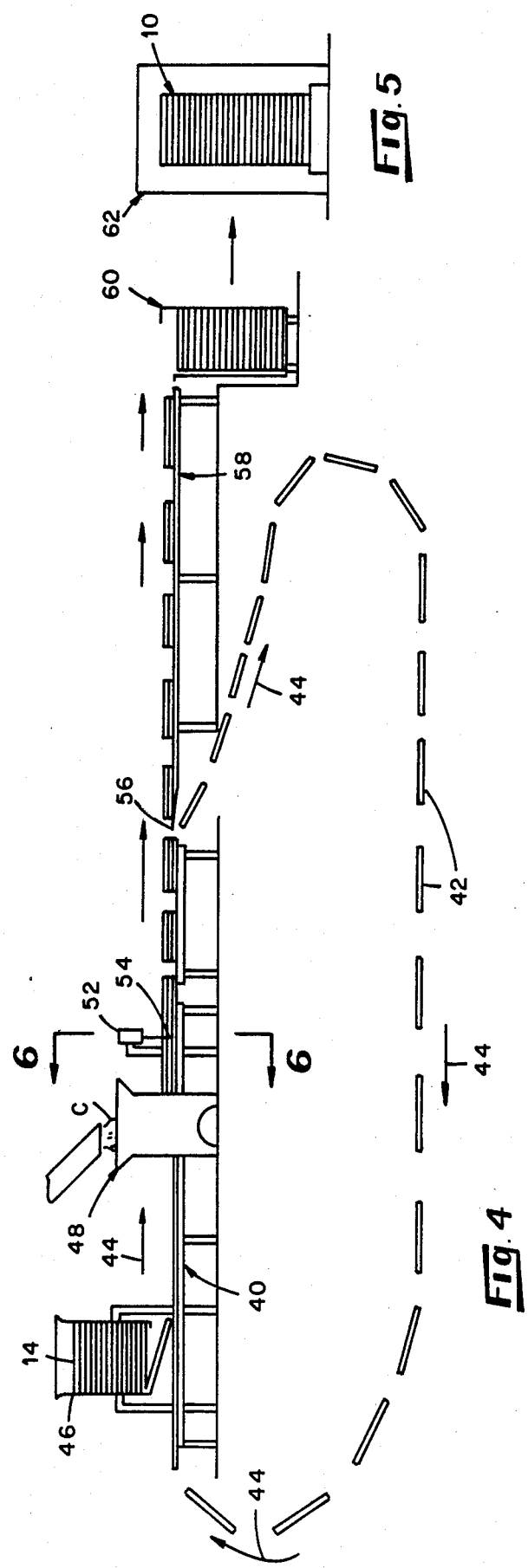
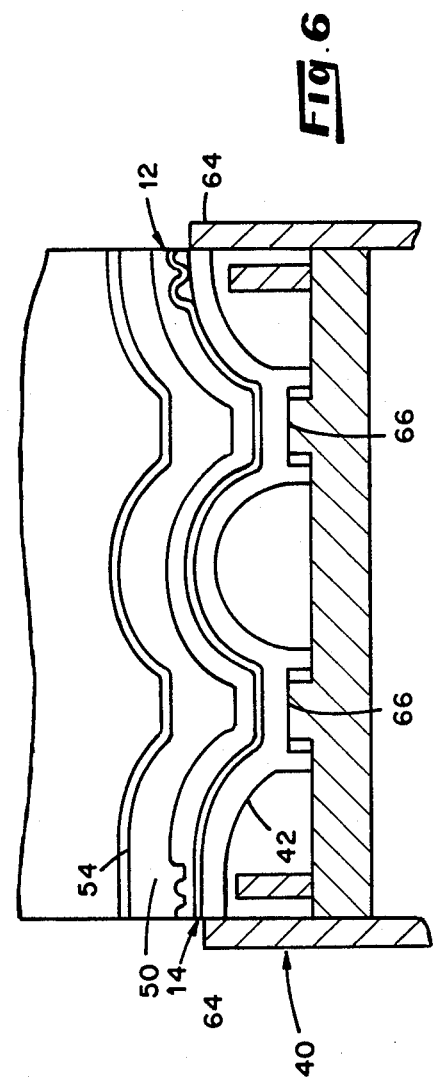

REINFORCED CONCRETE TILE AND ITS METHOD OF MANUFACTURE

The present invention relates to cementitious tile products and more specifically relates to a reinforced, concrete tile and its method of manufacture.

Most commercially available cementitious tile products, especially those used in the roofing industry, consist of tile units formed of a single layer of concrete shaped to correspond to the desired surface appearance of the tile. Experience in the roofing industry has established certain minimum physical attributes that such tiles must have in order to obtain the required strength of the tiles. For example, to provide the necessary structural integrity of the roof covering, existing concrete roof tiles ordinarily include 12 to 13 pounds of concrete in a tile having a dimension of about 1.4 square feet. The combined weight of these tiles requires the use of substantial additional roof support structure over and above the structure required for other roof coverings such as asphalt shingles. Yet, concrete tiles are popular since a roof covering consisting of concrete tiles has an extremely long life, whereas asphalt shingle roofs must be replaced a number of times during the life of the structure. Even so, the use of concrete tiles has generally been limited to the original construction stage of the roof, since at that time, the additional support structure needed for the tiles can be incorporated. Concrete tiles have not been extensively used when replacing roofs originally provided with asphalt shingles due to the cost and inconvenience of adding the necessary support structure to the roof.

Accordingly, it is an object of this invention to provide a concrete tile that is significantly lighter in weight than existing concrete tiles so that the tiles can be used as a replacement roof covering for existing roofs to eliminate the necessity of adding additional support to the roof structure. It is also an object of this invention to provide a concrete roof tile which is as strong, or stronger, than existing tiles; while retaining the beneficial attributes of concrete roof tiles such as their permanence and aesthetic value as a roof covering.

The methods of manufacturing existing concrete tiles generally require the use of support pallets shaped to correspond to the desired shape of the undersurface of the tiles. Thus, a different-shaped pallet is needed for each of the various roof tile shapes. The pallets move in a production line through a concrete application station where the concrete is applied to the pallets. It has been the ordinary practice to utilize the pallets as supports in subsequent curing of the concrete, which is accomplished in an operation separate from the production line. Thus, the pallets are introduced into the production line ahead of the concrete application station and then are physically removed from the production line to accompany the tiles through the curing process. After curing, the tiles are separated from the pallets and the pallets are transported back to the production area and reintroduced into the production line.

The pallets used are ordinarily relatively heavy and expensive, and it is necessary that at least as many pallets be available and in active use as there are tiles in production at any given time. This requires that great numbers of pallets be handled continuously in order for the tile production process to continue uninterrupted. And, since the tiles are manufactured in a large variety of different shapes, a correspondingly large variety of different-shaped pallets are required. As a result, tile manufacturers must purchase, store and handle great numbers of pallets for each tile shape. The above practices complicate the production methods of existing concrete roof tiles and add a significant cost to their manufacture.

Thus, a further object of the invention is the provision of a method of manufacturing a tile of the character described which can be carried out on an continuous, automated production line and which eliminates the need to have the pallets accompanying the tiles when they are cured as has been the practice in the past, reducing the number of pallets required and allowing the pallets to be retained in the production line to reduce the manufacturing cost of the tile.

Other objects and advantages of the present invention will be readily appreciated by those of ordinary skill in the art as the same becomes better understood by reference to the following detailed description when considered in conjunction with the accompanying drawings in which:

FIG. 4 illustrates diagrammatically apparatus for use in practicing a method of manufacturing concrete roof tiles according to a preferred form of the present invention;

FIG. 5 is a side view of a curing chamber for use in the apparatus and method illustrated in FIG. 4; and FIG. 6 is a view along line 6—6 of FIG. 4 illustrating features of the tile and of the apparatus used in practicing the method shown.

Figure 1:
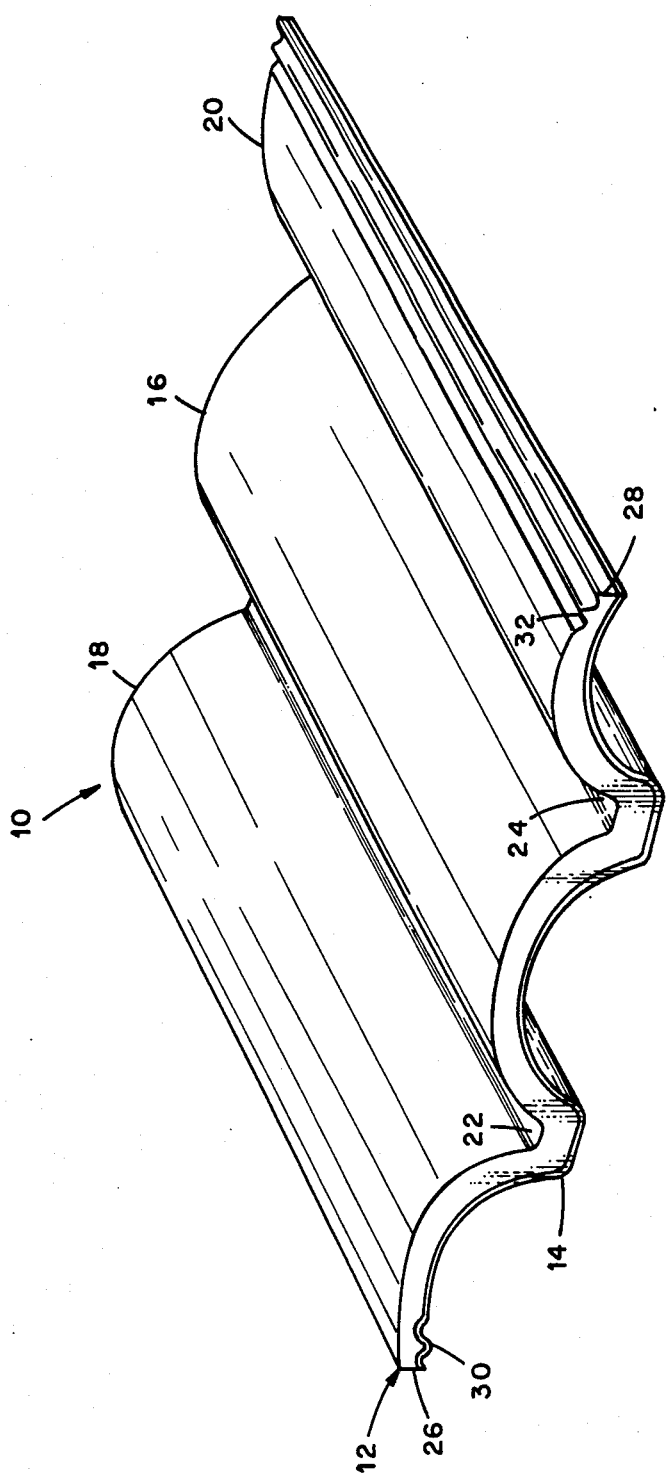
FIG. 1 is a perspective view of the upper surface of one form of a concrete roof tile constructed in accordance with the present invention.
Figure 2:
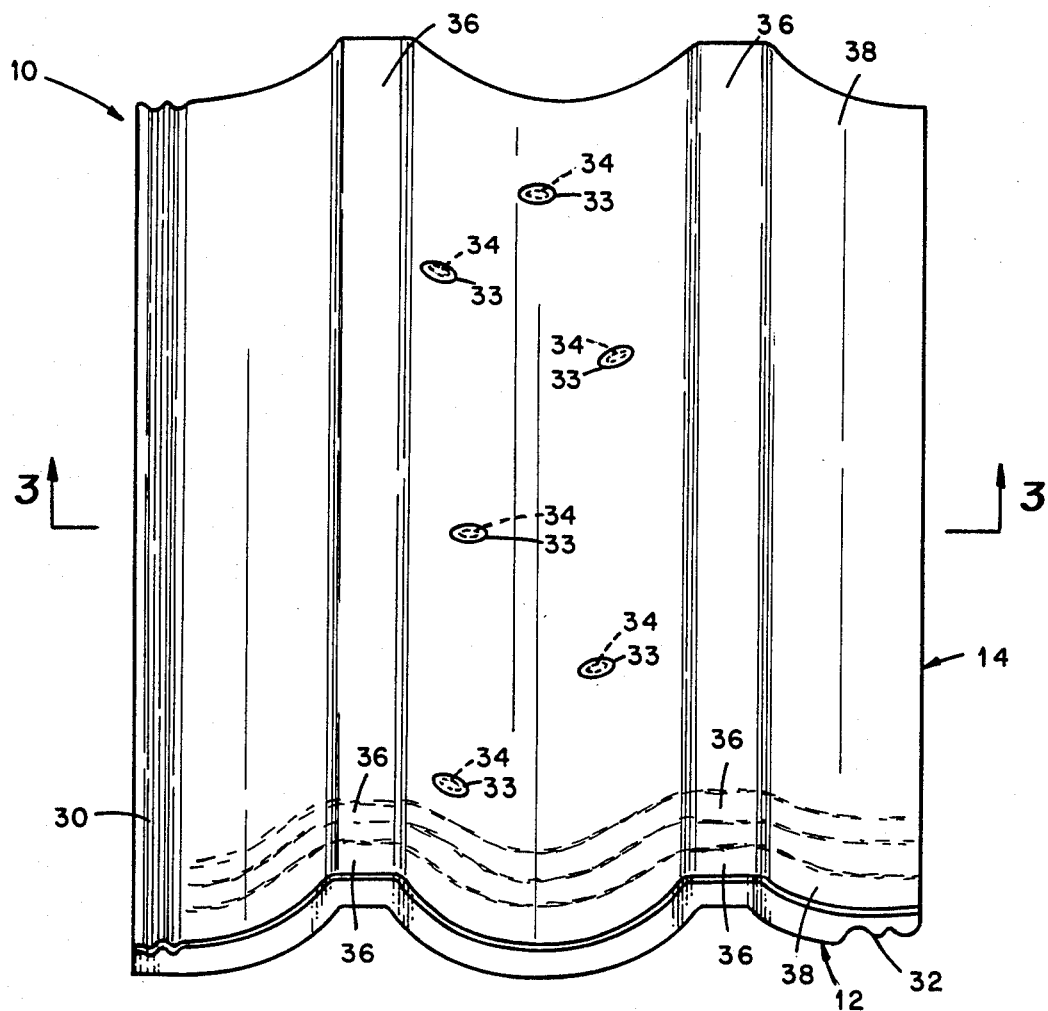
FIG. 2 is a perspective view of the lower surface of the tile shown in FIG. 1.
Figure 3:
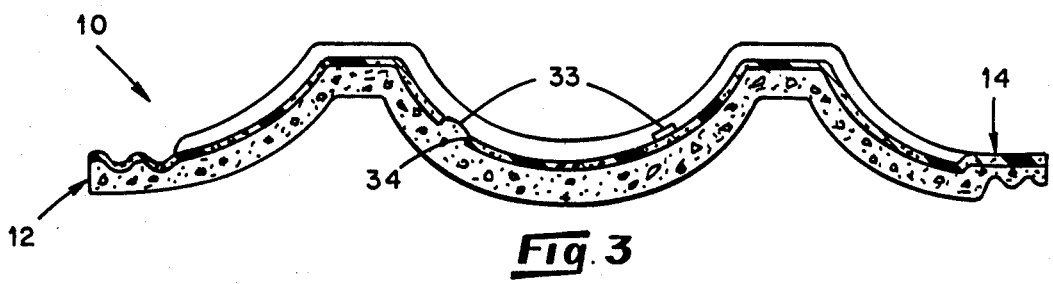
FIG. 3 is a view along line 3—3 of the tile shown in FIG. 2.

Referring now to the drawings in which like reference characters refer to like or similar parts throughout the several views, a concrete tile 10 is shown in FIGS. 1 through 3 illustrating one form of a tile constructed in accordance with the present invention. In general, the tile 10 includes an upper concrete layer 12 disposed on and secured to a preformed substrate backing layer 14, preferably formed of a substantially rigid polymeric substance. The shape of the tile 10 is exemplary of one of the more popular shapes presently used for roof tiles.

The tile 10 includes an elongate, arcuate central portion 16 and elongate segmentially arcuate portions 18 and 20 on opposite sides of the central portion 16. The radii of the side portions 18 and 20 are substantially equal and are substantially equal to the radius of the arcuate central portion 16 so that the tile 10 can be placed in a side-by-side, substantially mating relationship next to other like tiles with adjacent side portions overlapping to form courses of interlocking tiles on the roof. Valleys 22 and 24 are formed between each of the side portions 18 and 20 and central portion 16 for conducting water down the surface of the tile 10. Opposite lateral sides 26 and 28 of the tile 10 include elongate, grooved depressions 30 and 32 configured to be matingly positioned in correspondingly grooved sides of adjacent tiles in a course of tiles assembled to form a roof covering. As is shown, one set of grooves 30 is formed on the undersurface of the tile 10 and the other set of grooves 32 is formed on the upper surface of the tile 10 to provide the required mating arrangement with adjacent tiles. To facilitate this, the substrate member 14 is provided with the grooves 30 adjacent one of its side edges. The other grooves 32 are formed when the concrete layer 12 is applied to the substrate member 14.

A preferred means for securing the substrate member 14 to the concrete layer 12 includes the provision of concrete studs 33 integrally formed with the concrete layer 12 and extending through a plurality of spaced-apart openings 34 formed in the substrate member 14. The studs 33 are spaced so as to maintain the upper surface of the concrete layer 12 at the interface therebetween.

In the preferred embodiment, as will be more fully described, the studs 33 are formed by forcing wetted concrete mix through the openings 34 when the concrete is applied to the upper surface of the substrate member 14 so that the mix, after exiting the openings 34, spreads over a small area of the bottom surface of the substrate member 14 adjacent the openings 34. In this manner, when the concrete mix is cured, the studs 33 are hardened and have flattened heads located against the bottom surface of the substrate member 14. In effect, this locks the substrate member 14 on the concrete layer 12 so that the concrete layer 12 and substrate member 14 are intimately joined together so as to form an inseparable unit. The concrete layer 12 and substrate member 14 are also bonded together to a certain extent during heat curing of the concrete which further secures the two together along their mutually contacting surfaces.

The studs 33 provide a means for transmitting and distributing forces between the concrete layer 12 and substrate member 14. This insures that the flexural strength of the substrate member 14 is available for supporting the concrete layer 12 when loads are imposed on the tile 10 making the tile 10 highly resistant to cracking as a result of shear and compressive forces and other types of stresses to which tiles of this type are typically subjected.

The concrete mix used in forming the layer 12 is preferably a portland cement and an aggregate such as sand, properly proportioned in its components and which uses water as its vehicle. Many suitable mixes of this general type are available and widely used in the roof tile manufacturing industry.

As noted above, the substrate member 14 is substantially rigid and is preferably preformed from a polymeric material. A preferred construction of the substrate member 14 is accomplished using a fluid impervious, epoxy resin reinforced with fiberglass in a mat form, and may be molded from a sheet to assume the desired form. Additional polymeric materials which may be used to construct the member 14 are exemplified by polyethylene, polypropylene, polybutylene, polystyrene, polyacrylate, polyester, polyamide, fluoroplastics, acrylonitrile-butadiene-styrene (ABS resin), and polyvinyl chloride and its copolymers.

The reinforcing fiberglass mat or fabric is selected for imparting high flexural strength to the tile 10 and is therefore preferred, although chopped fiberglass may also find advantageous use in the tile construction in some circumstances. Preferably, the fiberglass used is resistant to alkali and would therefore include, for example, zirconium oxide to prevent degradation of the substrate member 14 which could occur when the concrete mix is applied to its upper surface. However, fiberglass which is not resistant to alkali may be used in some circumstances, and chemical attack thereof may be greatly reduced by taking advantage of pozzolanic fly ash which reduces the alkalinity of the concrete mix. Fibers other than fiberglass may be used so long as the proper considerations are addressed in the selection such as strength, chemical resistance to alkali, etc., and include, for example, nylon and polyester. To make the substrate members 14 stable to heat and light, antioxidants and stabilizers, of which a number of suitable composition are available, may be added during manufacture of the substrate member 14 such as where the substrate members 14 are constructed of polymers which are subject to attack by heat and light.

The substrate member 14 may be produced by a number of commercially available processes. The preferred process is the so-called "fiberglass prepreg" wherein fiberglass sheets are preimpregnated with a partially cured epoxy resin and stored at a low temperature until ready for use. At the appropriate time, the sheets are placed in a hot die which permanently conforms the sheets to the desired shape of the substrate member 14. Other processes which may be used include the process of warm forming sheets of thermoplastic polymer in which a certain percentage of fibers, if necessary, have been incorporated therein to improve the mechanical properties of the sheets. In this process, a sheet of thermoplastic is placed in a die which is heated to a temperature a few degrees below the melting point or softening point of the thermoplastic. The die is closed and the sheet conforms to the desired shape of the substrate member 14. The die is held closed for a very short time which may be less than one minute and then opened and the substrate member 14 released. Also available for production of the substrate member 14 are injection molding techniques including "RIM" or reaction injection molding as well as continuous melt or solid state extrusion of polymer strips of sheet material into the desired shape of the substrate member 14.

The finished substrate member 14 preferably has a strength equal to or greater than the strength of the concrete layer 12, thereby providing fracture resistance to tensile stresses on the underside of the concrete layer 12 permitting a substantially thinner concrete layer to be used, and thus a significantly lighter tile. The preferred construction of the substrate member 14 also adds rigidity to bending forces applied to the concrete layer 12, thus acting as a substitute support for the omitted thickness of concrete which the use of the substrate member 14 eliminates.

Since the tile 10 employs a thinner layer of concrete, the tile 10 would rest with its upper surface at a lower height than the thicker existing concrete tiles. To make the tile 10 of the present invention interchangeable for use in replacing broken or damaged tiles in an existing concrete tile roof, the tile 10 may be provided with bosses 36 on its lower surface to raise the height of the tile 10 above its supporting surface, whether the supporting surface be a portion of another tile or the flat part of a roof support structure. Through the use of the bosses 36, preferably provided as projections on the undersurface of the substrate member 14, the upper surface of the concrete layer 12 within a course of other thicker existing tiles will project to substantially the same height as the upper surface of the other tiles in the course. Similarly, the opposite longitudinal ends of the substrate member 14 are formed with laterally extending depressions 38 which are seen as projecting from the substrate member 14 in FIGS. 2 and 3. The depth of the depressions 38 is determined to provide that the apparent thickness of the concrete layer 12, when viewing the tile 10 straight on from one of its longitudinal ends, appears to be equal to that of a conventional concrete tile. Thus, when the tile 10 is inserted into a course of existing tiles, there is no gap along its visible edge as would be the case if the true thickness of the tile 10 were extended to the longitudinal edges. In this manner, the tile 10 is essentially unnoticeable when used to replace the heavier, thicker tiles in an existing roof.

A preferred form of the method of the present invention will now be described with reference to FIGS. 4 through 6. The method includes providing the substrate members 14 in a preformed state already cut and shaped to correspond to the desired shape of the undersurface of the tiles 10. Wet concrete mix is disposed on the upper surfaces of the substrate members 14 and is then shaped to obtain the desired thickness and configuration of the concrete on the individual substrate members 14. The concrete is then cured so that the concrete sets into a substantially rigid mass and is secured to the substrate members 14. As described above, a preferred means for securing the substrate members 14 to the concrete layers 12 includes forcing the wet concrete mix into the openings 34 in the substrate members 14 and then curing the concrete causing the concrete to harden in the openings 34 to form the studs 33, firmly securing the substrate members 14 to the concrete layers 12.

One form of the apparatus useful in practicing the method of the present invention is illustrated diagrammatically in FIGS. 4 through 6 and includes conveyor means 40 for supporting and conveying a plurality of pallets 42 through an endless path, the direction of movement of the pallets 42 being indicated by arrows 44. The pallets 42 may be conveyed under a hopper 46 containing a supply of preformed substrate members 14. Provision is made (not shown) for feeding the members 14 onto the pallets 42, one at a time. The pallets 42 are preferably proportioned to substantially correspond to the shape of the undersurface of the substrate members 14 so that the same are evenly supported on the pallets 42. Likewise, the pallets 42 have a longitudinal dimension substantially equal to the longitudinal dimension of the substrate members 14.

The feeding of the substrate members 14 and positioning of the pallets 42 at the location of the hopper 46 is arranged to provide that the ends of the pallets 42 are in substantial abutment on the conveyor 40 and the substrate members 14 are properly positioned on the pallets 42 with their leading and trailing edges substantially aligned with the leading and trailing edges of their associated supporting pallets 42.

The pallets 42 convey the substrate members 14 through a concrete application station 48 containing a supply of wet concrete mix C of a suitable composition which is applied to the upper surfaces of the substrate members 14. While the substrate members 14 are in the concrete application station 48, pressure is applied to the concrete mix C which forces it into the openings 34 in the members 14 to produce the studs 33 as described. When the pallets 42 and their associated substrate members 14 exit the station 48, the concrete is shaped on the upper surface of the substrate members 14 using a screed 50, a portion of the face of which is visible in FIG. 6. The screed 50 is configured with a lower edge shaped to correspond to the desired contour shape of the concrete layer 12, which is defined upon the exit of the substrate members 14 from the station 48. This process of forming the concrete layers 12 is often referred to as extrusion and many apparatus of various configurations are known for performing this function.

A cutter 52 is positioned adjacent the exit of the pallets 42, substrate members 14, and the now defined concrete layer 12 from the station 48. The cutter 52 includes a blade 54 vertically reciprocatable upon the passage thereunder of the abutting trailing edge of each pallet 42 and its associated substrate member 14, and the leading edge of the following abutting pallet 42 and its associated substrate member 14. The blade 54 divides the concrete applied to the upper surfaces of the substrate members 14 at the front and back longitudinal ends of each substrate member 14 to define the longitudinal dimension of the concrete layers 12 and thus the final configuration of the individual tiles 10.

After the individual pallets 42 and their associated substrate members 14 and concrete layers 12 pass the cutter 52, the substrate members 14 and concrete layers 12 are separated from the pallets 42 at a separating station 56 through use of separating means (not shown) and the pallets 42 are conveyed back to the hopper 46. A conveyor then conveys the formed tiles 10 to a stacking station 60 where the tiles 10 are stacked. The stacked tiles 10 are then cured which may be accomplished by transporting the tiles to a curing oven 62 where they are subjected to a flow of heated air at the appropriate temperature and humidity for the appropriate length of time to obtain the desired curing effect of the concrete layers 12.

As shown in FIG. 6, the blade 54 of the cutter 52 is preferably configured to correspond substantially to the shape of the upper surface of the pallets 42. The cutter 52 is operable to move the blade 54 at least through the concrete layer to effect the desired separation of the concrete layers between adjacent pallets 42 and substrate members 14. Also, significant lateral movement of the pallets 42 is prevented through the use of upstanding side rails 64 on the conveyor 40, and the pallets 42 may be guided along the conveyor 40 on rails 66 and conveyed thereon through the use of a chain (not shown).

The concrete tile 10 produced according to the preferred form of the method of the present invention may be further illustrated by way of the following example which is provided solely for the purpose of illustration, and therefore is not to be construed as limiting the scope of the invention.

A supply of preformed substrate members 14 are produced by impregnating woven fiberglass sheets or mats with a partially cured epoxy resin. The epoxy resin may be of the type produced from epichlorohydrin and bisphenol A and is poured into the fiberglass sheets to impregnate the sheets. Then, the resin is partially cured which increases the viscosity of the resin so that the composite sheets can be handled and stored. Individual substrate members 14 are produced by placing the partially cured composite sheets in hot dies shaped to correspond to the desired finished shape of the members 14, holding the sheets in dies for the necessary period of time to effect setting of the epoxy resin, removing the sheets from the dies, and cutting the members 14 from the sheets. The members 14 are then stacked and stored for being transported to the hopper 46 shown in FIG. 4.

A slurry of suitable concrete mix is prepared using portland cement with sand as an aggregate and water as its vehicle. The mix may include, for example, by weight, 24 percent cement, 64 percent sand, and 12 percent water with coloring added, if desired, for aesthetic reasons.

The concrete mix is applied to the substrate members 14 as described at the application station 48 and the individual cut tiles 10 emerge from the cutter 52. The tiles 10 are cured by transporting stacks of the tiles to the curing oven 62 and subjecting the tiles to a circulating airflow at about 120 degrees and 100 percent humidity for 6 hours.

The method described offers significant advantages over the production methods employed in existing concrete tile manufacturing plants. For example, the pallets 42 are retained in the production line and are movable in an endless path. Existing manufacturing methods require that the pallets accompany the tiles as supports during curing of the tiles. This requires that the pallets be removed from the production line and stacked along with the tiles in the curing oven. After curing, the pallets are separated from the tiles and reintroduced at the beginning of the production line. The present method eliminates this practice. The pallets 42 employed in the present method serve as supports for the substrate members 14 only during movement of the members 14 through the concrete application station 48 and past the cutter 52. Then, the substrate members 14 and the concrete layers 12 supported thereon are separated from the pallets 42 and the pallets 42 are conveyed back to the beginning of the production line to receive new substrate members 14. The pallets 42 are therefore not removed from the production line during manufacturing of the tiles. This greatly reduces the number of pallets needed since it is only necessary to have enough pallets to equip the conveyor 40. Also, while the particular pallet shown is shaped to correspond to the substrate member 14, pallets may also be used having an upper surface with an alterable geometry so that it is not necessary to reequip the conveyor 40 each time a new tile configuration is to be produced.

Another advantage of the present method lies in the use of the substrate members 14 as supports for the concrete during production and curing to eliminate the practice of the curing stage of their manufacture. Furthermore, while the substrate members 14 serve as supports during the manufacturing process, they also become a part of the finished tile 10 upon the curing of the concrete layer 12. Thus, the additional step of separating the tiles from their supports after curing is eliminated. And the substrate members 14, being preformed and substantially rigid when introduced into the production line, provide firm and even support for the being cured and, due to the configurations of their undersurface, serve to maintain a degree of separation of the tiles during the curing process to permit airflow between the stacked tiles. And after curing, the substrate members 14 serve as barriers between tiles that are stacked in the storage areas to prevent the tiles from abrading which is a significant problem with tiles formed slightly of concrete.

The tile 10 produced according to the method is significantly lighter in weight than existing concrete tiles. For example, concrete tiles are produced according to the method of having an individual weight in the neighborhood of 6 to 8 pounds whereas existing concrete tiles require 12 to 14 pounds of concrete for the same roof coverage. Yet, the tiles are as strong or stronger than existing tiles employing almost twice as much concrete. In this regard, it has been determined that the tiles of the present invention have a strength to compression forces in excess of 1000 pounds per square inch without fracture. Existing tiles have a strength to compression forces without fracture in the neighborhood of 350 to 500 pounds per square inch. This advantage of the present invention is believed to be due to the additional reinforcement provided by the substrate 14 which provides a high degree of resistance to flexural loadings and especially resistance to impact-impulse loadings on the tile. Moreover, the preferred manner of securing the substrate member 14 to the concrete layer 12 through the use of the openings 34 in the substrate member 14 and studs 33 provides, for example, a significant degree of fracture resistance to tensile stresses on the underside of the concrete layer 12. This makes the tile 10 of the present invention much more resistant to fracture than existing tiles. One important advantage offered by this feature of the invention is a substantial reduction in the number of tiles that are broken during storage, transfer and assembly of the tiles to form a roof covering.

A roof constructed of the tiles 10 is also substantially leak-proof since preferred construction of the substrate members 14 makes them essentially fluid impervious. That is, should any cracks form in the concrete layers 12, the substrate members 14 provide a barrier substantially eliminating water flow through the tile 10 to the roof support structure.

Although a particular embodiment of the concrete tile and its method of manufacture has been described in the foregoing detailed description, it will be understood that the invention is capable of numerous rearrangements, modifications and substitutions of materials, and steps without departing from the scope of the invention as set forth in the claims below.

What is claimed:

1. A reinforced concrete roof tile having an upper, outer surface and a lower, inner surface, and width, length, and thickness dimensions, the tile being adapted for arrangement with other like tiles to form a roof covering with the upper, outer surface of the tile disposed to face outwardly and the lower, inner surface disposed to face inwardly towards an underlying roof support structure, the tile comprising:

a substantially rigid polymeric substrate member defining the lower inner surface of the tile;

a layer of concrete cured in situ on the upper surface of said substrate member, said concrete layer being shaped to define the upper, outer surface of the tile;

said substrate member and concrete layer together defining the thickness dimension of the tile, which dimension is small as compared to the length and width dimensions; and said substrate member being sufficiently inflexible to provide support to said concrete layer against the imposition of forces in the nature of flexural loading applied to the tile to enable a reduction in the thickness of said concrete layer which would otherwise be required to withstand the imposition of such forces, whereby the overall weight of the tile and its thickness dimension is reduced as compared to a concrete roof tile consisting solely of concrete, without a significant reduction in the strength of the tile.

2. The tile of claim 1, wherein said substrate member comprises a sheet of epoxy impregnated fiberglass mat.

3. The tile of claims 1 or 2, wherein said substrate member is at least as strong as said concrete layer so that said substrate member provides fracture resistance to tensile stresses imposed on said concrete layer.

4. The tile of claim 1, wherein said substrate member includes at least one through opening and a portion of said concrete layer extends into and through said at least one opening and covers at least a portion of the lower surface of said substrate member adjacent said at least one opening, whereby said substrate member is secured to said concrete layer.

5. The tile of claims 1 or 4, wherein said substrate member and said concrete layer are bonded together along at least a portion of the interface between their upper and lower surfaces to secure said substrate member to said concrete layer.

6. A method of manufacturing a reinforced concrete tile in a desired shape, comprising:
providing a substantially rigid polymeric substrate member having a lower surface configured to substantially correspond to the desired shape of the lower surface of the tile;
disposing a settable concrete mix on the upper surface of the substrate member;
shaping the concrete mix disposed on the substrate member to form a layer of concrete on the substrate member configured to substantially correspond to the desired shape of the upper surface of the tile; and
curing the concrete layer so that the concrete sets into a substantially rigid mass bonded to the substrate member.

7. The method of claim 6, further comprising providing the substrate member with a plurality of through openings and forcing a portion of the settable concrete mix through said openings so that the concrete substantially extends through the openings to the lower surface of the substrate member and spreads over at least a portion of the lower surface of the substrate member adjacent the opening, whereby the substrate member is secured to the concrete layer when the concrete layer is cured.

8. The method of claims 6 or 7, further comprising:
moving the substrate member through a concrete application station;
disposing the settable concrete mix on the substrate member as the substrate member moves through the concrete application station;
shaping the concrete mix as the substrate member and concrete mix disposed thereon exit the concrete application station by conveying the substrate member and concrete mix disposed thereon under a screed configured to produce a contour on the upper surface of the concrete layer corresponding to the desired shape of the upper surface of the tile; and
edging the concrete layer disposed on the substrate member so that the leading and trailing edges of the concrete layer are aligned with the leading and trailing edges of the substrate member.

9. The method of claim 8, wherein a plurality of concrete tiles are produced, and the method further comprises:
providing a plurality of movable pallets for supporting the substrate members, each of said pallets having a length substantially equal to the length of the substrate members;
supporting the pallets for movement in a loop, a portion of which extends through the concrete application station;
providing motive means for moving the pallets in the loop;
employing said motive means to move the pallets in the loop;
feeding the substrate members onto the pallets ahead of the concrete application station so that each substrate member is supported on one of said pallets with its leading edge substantially aligned with the leading edge of its supporting pallet; and
separating the substrate members and concrete layers disposed thereon from the pallets after the concrete layers have been edged.

10. The method of claim 6, wherein the substrate member provided comprises a fiberglass mat impregnated with epoxy resin.

* * * * *

UNITED STATES PATENT AND TRADEMARK OFFICE
CERTIFICATE OF CORRECTION

PATENT NO.   : 4,752,520
DATED        : June 21, 1988
INVENTOR(S)  : Robert B. Franklin It is certified that error appears in the above-identified patent and that said Letters Patent is hereby corrected as shown below:

Column 3, line 10, after surface insert -- substrate member 14 in substantial contact with the lower surface --.

Column 4, line 8, "composition" should be -- compositions --.

Column 6, line 51, "into" should be -- onto --

Column 7, line 56, "slightly" should be -- singly --

Signed and Sealed this

Twenty-second Day of November, 1988

Attest:

DONALD J. QUIGG

Attesting Officer

Commissioner of Patents and Trademarks